(12) United States Patent
Albornoz

(10) Patent No.: US 9,521,191 B2
(45) Date of Patent: Dec. 13, 2016

(54) COMPUTING DEVICE, METHOD, AND PROGRAM FOR DISTRIBUTING COMPUTATIONAL LOAD

(71) Applicant: FUJITSU LIMITED, Kawasaki-shi, Kanagawa (JP)

(72) Inventor: Jose Albornoz, Iver Heath (GB)

(73) Assignee: FUJITSU LIMITED, Kawasaki (JP)

( * ) Notice: Subject to any disclaimer, the term of this patent is extended or adjusted under 35 U.S.C. 154(b) by 113 days.

(21) Appl. No.: 14/319,129

(22) Filed: Jun. 30, 2014

(65) Prior Publication Data
US 2015/0095423 A1    Apr. 2, 2015

(30) Foreign Application Priority Data
Sep. 30, 2013 (EP) .................................. 13186667

(51) Int. Cl.
*H04L 29/08* (2006.01)
*G06F 1/32* (2006.01)
*G06F 9/50* (2006.01)

(52) U.S. Cl.
CPC ............... *H04L 67/10* (2013.01); *G06F 1/32* (2013.01); *G06F 9/50* (2013.01); *H04L 67/1002* (2013.01)

(58) Field of Classification Search
CPC .............. G06F 1/32; G06F 9/50; H04L 67/10; H04L 67/1002
See application file for complete search history.

(56) References Cited

U.S. PATENT DOCUMENTS

| | | | |
|---|---|---|---|
| 2009/0106571 A1 | 4/2009 | Low et al. ................ | 713/310 |
| 2011/0154073 A1 | 6/2011 | Wang et al. .............. | 713/320 |
| 2012/0041600 A1* | 2/2012 | Michael ............ | G05D 23/1932 700/276 |
| 2012/0204176 A1* | 8/2012 | Tian ................... | G06F 9/505 718/1 |
| 2013/0067469 A1 | 3/2013 | Das et al. ................ | 718/1 |
| 2013/0103218 A1* | 4/2013 | Das ..................... | G05B 11/01 700/291 |

(Continued)

FOREIGN PATENT DOCUMENTS

| EP | 2 615 897 A1 | 7/2013 |
|---|---|---|
| WO | WO 2010/112045 A1 | 10/2010 |

OTHER PUBLICATIONS

Extended European Search Report issued Apr. 2, 2014, in corresponding European Patent Application No. 13186667.5.

*Primary Examiner* — Joe Chacko
(74) *Attorney, Agent, or Firm* — Staas & Halsey LLP

(57) ABSTRACT

A method for distributing load among interconnected computing devices, each computing device having a designated position in each dimension of an array of designated positions, the method comprising, individually, at one or more computing devices per position in a series of positions in one dimension of n-dimensions, in which one dimension and one direction is assigned as a load transfer direction, executing a process including: obtaining an indication of current capacity for additional load at each member of a group of computing devices from among the computing devices; transferring load from the executing computing device to a member of the group at which it is indicated that there is capacity for additional load; where membership of the group is restricted to a computing device on the load transfer direction side of the executing computing device in the one dimension.

15 Claims, 8 Drawing Sheets

(56) References Cited

U.S. PATENT DOCUMENTS

2014/0101226 A1\* 4/2014 Khandekar ......... H04L 67/1008
709/203
2014/0188801 A1\* 7/2014 Ramakrishnan .. G06F 17/30575
707/634

\* cited by examiner

COMPUTING DEVICE, METHOD, AND PROGRAM FOR DISTRIBUTING COMPUTATIONAL LOAD

CROSS REFERENCE TO RELATED APPLICATIONS

This application claims the benefit of European Application No. 13186667.5, filed Sep. 30, 2013, the disclosure of which is incorporated herein by reference.

BACKGROUND OF THE INVENTION

This invention lies in the technical field of computational load distribution in networked computing environments. In particular, the invention lies in the field of green data centre technology, and energy-efficient data center load distribution.

Given their enormous electrical power consumption and associated carbon footprint, computing environments such as data centres are natural targets for techniques aimed at improving their energy efficiency and reducing their impact on the environment. This is especially true in light of the explosive growth in the number of data centres and the increasing dependence of our society on the information technology and computing services provided by them. Besides, energy costs are a major fraction of the operating costs of data centres, becoming almost as important as the cost of the facilities and equipment.

Data centers use some energy to power the IT equipment; computers, storage and networking equipment. The operation of this equipment produces heat (roughly equivalent to the amount of power provided to the IT equipment as there is no other way to dissipate the used energy) so another major use of data centre power is to remove this heat from the data centre equipment and halls and to expel it to the outside (by using, for example, air conditioners).

Existing data centers are provided with global/centralised controllers which gather information from the devices in the data centre, and allocate and redistribute tasks among the individual devices in order to pursue a particular policy goal, such as energy efficient operation. Complex algorithms exist for calculating and realising optimum distribution of computational load among devices and correct operating settings of cooling equipment.

As the size of data centres grows, and their increasing importance in IT infrastructure provision increases, the complexity of the algorithms executed by the global/centralised controllers in order to meet energy efficiency targets also increases.

The transferring load step may be conditional upon the obtained indications, so that the process executed by the individual computing devices comprises the steps of: obtaining an indication of current capacity for additional load at the or each member of a group of one or more computing devices from among the plurality of computing devices; if, based on the obtained indications of current capacity for additional load at the or each member of the group, there is a member of the group with capacity for additional load, transferring load from the executing computing device to a member of the group at which it is indicated that there is capacity for additional load. Of course, because load is transferred which was already hosted by or handled by a computing device, the method may be considered to be a method for redistributing load among a plurality of interconnected computing devices.

Membership of the group is restricted to computing devices to a particular side of the executing computing device in the one dimension, the particular side being consistent for each execution of the process (regardless of executing computing device) and being defined as the load transfer direction side. For example, if the load transfer direction is from low to high in the x-dimension, and designated array positions are given as (X, Y), for $1 \leq X \leq Xmax$, and $1 \leq Y \leq Ymax$, then for an executing computing device designated position (X, Y), membership of the group is restricted to computing devices designated X coordinates of X+1 or higher up to a maximum of Xmax. Of course, it may be that membership of the group is more restricted: for example, it may restricted to a computing device or computing devices in a subsequent adjacent designated position to the executing device in the load transfer direction of the one dimension, or it may be restricted to a computing device or computing devices within a predetermined maximum number of designated positions of the executing device in the load transfer direction of the one dimension. Furthermore, when there is more than one dimension in the n-dimensional array, membership may be restricted in terms of designated position in one or more of the other dimensions.

The n-dimensional array may be, for example, 1-dimensional, 2-dimensional, 3-dimensional, or any positive integer number of dimensions. For example, some data centre architectures may designate positions according to a six-dimensional array. The dimensions may be notional dimensions, defined only by the allocation of coordinates (designated positions) to computing devices, or may represent the physical location of the computing device among the plurality of interconnected computing devices.

The series of designated positions in one dimension of the n-dimensions may be every position from the first position to the penultimate position, inclusive. That is, every position except for the final position in the load transfer direction. The one or more computing devices per designated position which execute the process may be each computing device to which the designated position is designated. In addition, the one or more computing devices per designated position which execute the process may be restricted to those computing devices which currently have load. In other words, an order is established in which the computing devices are to execute the process, and computing devices not having load when it comes to their turn in the order do not execute the process. This order may be random, or may follow some logical order. For example, the logical order may be determined in accordance with the designated positions of the computing devices, working through in some logical order which may include determining the order in which computing devices are to execute the process in dependence upon their position in the one dimension in which the load transfer direction is assigned (for example with increasing or decreasing position in the load transfer direction). However, if a computing device is not hosting any load when it comes to that computing device's turn to execute the process, that computing device does not execute the process, and the process is executed by the next computing device in the order which has load to transfer. The process is executed by one computing device at a time, in turn (according to the order, see above), and may comprise a step of, after completion of load transfer, requesting or notifying or instructing the next computing device in the order to execute the process.

Embodiments may be such that a computing device is assumed to be an operational computing device, able to process/handle load, and non-operational computing devices may be considered not to be part of the plurality of interconnected computing devices. Alternatively, it may be that non-operational computing devices are considered to be included in the plurality of interconnected computing devices, but are not able to execute the process, and when acting as a group member are taken to have no/zero capacity for additional load.

SUMMARY OF THE INVENTION

Embodiments include a method for distributing load among a plurality of interconnected computing devices, each computing device having a designated position in the or each dimension of an n-dimensional array of designated positions, the method comprising, individually, at one or more computing devices per designated position in a series of designated positions in one dimension of the n-dimensions, in which one dimension one direction is assigned as a load transfer direction, executing a process including: obtaining an indication of current capacity for additional load at the or each member of a group of one or more computing devices from among the plurality of computing devices; transferring load from the executing computing device to a member of the group at which it is indicated that there is capacity for additional load; wherein membership of the group is restricted to a computing device or computing devices to the load transfer direction side of the executing computing device in the one dimension.

In invention embodiments, the directional bias to the membership of the group has the effect of causing an overall migration of load from one side of the array to another. Thus, the computing devices which are in designated positions at which the process is to be executed may execute the process in any order and still achieve a net migration from one side to another (in the load transfer directions).

Designated positions denote an ordering of computing devices in each of the n-dimensions, and also enable distances between computing devices to be established in the context of the array of designated positions.

Advantageously, methods embodying the present invention cause computing load to be transferred among computing devices in a manner which promotes efficient load handling and which utilises peer to peer transactions without the need for a centralised control or reporting mechanisms. The computing devices self-organise into groups in a sequential manner, and transfer load in a direction which is consistent across all groups (or which has a positive component in a direction which is consistent across all groups). The overall effect is a coordinated transfer of load in a particular direction in terms of the array of designated positions. The effect is exaggerated by repetition, so that over the course of a number of repetitions, more load is transferred further in the particular direction in the array of designated positions, with the eventual effect of filling the nodes toward one end of the particular direction and emptying the nodes at the other. Thus, since nodes tend to run at high efficiency when they are at capacity in terms of load, and can be powered down when they are empty, the combined efficiency of the plurality of computing devices increases.

Furthermore, methods embodying the present invention provide a mechanism for controlling which of the nodes become heavily-loaded, by designating them at a particular end (in the direction of the load transfer direction) in one dimension of an n-dimensional array of designated positions. It may be that the nodes which operate most efficiently, for example, because they handle a greater amount of load and/or are placed conveniently for a cooling mechanism, are designated at the end of the one dimension of the array toward which load is transferred.

The method takes place in the absence of intervention by or interaction with a centralised reporting or control function, with the nodes self-organising into groups with roles defined by designated position. Some administrative or centralised control may be required in the initialisation of the designated array of positions and the loading of instructions (for example, a computer program) which enable the computing nodes to carry out the method, but no further intervention is required in performing the method.

The method may be performed as a software function, for example, a function of the operating systems of the computing devices. For example, the operating system may execute processing according to one set of instructions when executing the process, and according to another set of instructions when a member of a group for another computing device. Software embodying the invention, when executed by a computing device, causes the computing device to realise functional modules including a capacity indication obtaining module for performing the obtaining step, and a load transfer module for the load transfer step (and for determining whether and which load transfers to perform).

Thus, embodiments which redistribute an amount of computational load selected in a manner such as that described above, from a computing device executing the process, to a recipient computing device located to a particular side of the executing computing device in the array of designated positions, define an energy-efficient, easily scalable algorithm for load migration. Embodiments use only local information, so the need for a centralised control mechanism for load distribution is avoided. Furthermore, the simplicity of the algorithm and the small bandwidth required allows for a small execution time; therefore the necessary VM (Virtual Machine) migration (load transfers) could take place at a timescale which is much shorter than the rate at which incoming service requests (new computational load) arrive.

The computing devices may be configured to self-organise into groups. For example, the group may be selected by the executing computing device at each execution and defined by the issuance of a request for an indication of current capacity to the group members. Alternatively, membership of a group for a particular computing device may be more long-term, and once another computing device has been notified that it is in the group for a particular computing device, the another computing device is configured to report its load information to the particular computing device, for example, on a periodical basis or in response to a trigger such as a request. The group for a particular executing computing device may be determined, for example, by proximity to the executing device in one or more dimensions in the array, bearing in mind the directional restriction.

In embodiments in which n is greater than or equal to two, membership of the group may be restricted to a computing device or computing devices within a predetermined number of designated positions of the individual computing device in the one dimensions and/or each of the other n-dimensions than the one dimension.

For example, the predetermined number may be 1, 2, or any positive integer. Advantageously, limiting the membership of the group by setting the predetermined number at, for example, 1, keeps the reporting overheads of the method low, but still facilitates load transfers which will tend toward one end of the array of designated positions being loaded to full capacity. Furthermore, having three or more members of the group provides some resistance to node (node being used interchangeably with computing device in this document) failure, since even if one or more member(s) of a group fail, as long as one member of the group is operational, there is still a path for computing load to be transferred in the load transfer direction. In particular embodiments, in addition to other restrictions, membership of the group may be restricted to operational nodes (that is, nodes which are functioning and are not, at that time, suffering from a breakdown or some other form of failure).

In embodiments in which n is equal to two, each computing device in the subsequent adjacent designated position to a designated position may be a member of a group for at least one of the computing devices in the designated position.

Load is transferred away from the computing devices executing the process in the load transfer direction. The members of the group are candidates for receiving load from the computing device executing the process. A configuration in which each computing device per position (in one dimension) is a member of a group for at least one computing device in the previous adjacent position (in the one dimension) ensures that each computing device has the opportunity to receive load, and thus the saturation of one end of the array with load can be more complete, and the migration of load is quicker in terms of method repetitions.

Optionally, the one or more computing devices per designated position in one dimension executing the process is each computing device in the designated position.

Particular implementations may require that all load be transferable and that all computing devices transfer load in the load transfer direction. In such implementations the migration of load will be quicker and the saturation of one end of the array with computing load may be achieved in a more complete fashion.

The process executed by the individual computing devices may further comprise: selecting the member of the group to which to transfer load, comprising: based on the obtained indications of current capacity for additional load at the or each member of the group, selecting the computing device having the greatest or smallest capacity from among the computing devices in the group indicated as having non-zero current capacity.

Advantageously, transferring load to the group member with the smallest non-zero capacity means that load transfers will tend to cause the recipient to reach capacity. Advantageously, while such a method does not transfer the most load in the fewest repetitions, it does result in recipient nodes being at capacity, and thus operating at or close to optimum efficiency. Over the course of more repetitions of the method, the nodes that are at capacity will tend to be those at the load transfer direction end of the one dimension.

Advantageously, transferring the load to the group member with the greatest capacity will ensure a high rate of load transfer is achieved, and thus the desired distribution of load (nodes at one end of the array being fully loaded) will be achieved in fewer repetitions of the method.

Embodiments may include transferring load from the executing computing device to a member of the group comprises transferring load until the member of the group has no remaining capacity for additional load or until the executing computing device has no remaining load.

Such a method is simple in terms of limiting each performance of the process to a single transfer between a donor (the node executing the process) and a recipient selected from among the group. The amount of load to transfer is thus determined by establishing which is smaller, the amount of load on the donor, or the capacity of the recipient. If the amount of load on the donor is smaller, then that amount of load is transferred to the recipient. If the capacity of the recipient is smaller, then the amount of load that will cause the recipient to reach capacity is transferred. The member of the group to which to transfer load is selected from among the group members in dependence upon the capacity of the group members for additional load relative to one another.

In addition to selecting a recipient computing device to which to transfer the computational load of the particular device, the computing device executing the process may also determine the amount of computational load to transfer. Restrictions are imposed by two factors: the current load of the executing computing device, and the current capacity of the node or nodes selected as recipient(s). It may be that there is some granularity in the size of tasks/amount of load that can be transferred, and that it is implicit in discussing amounts of load that, in some implementations, the amounts are approximate due to allowance for granularity. The allowance for granularity may depend on the nature of the load transfer. For example, if the executing computing device is to transfer an amount of computational load determined by the current capacity of the recipient computing device in order to increase the load of the recipient computing device up to its maximum capacity, then it may be that the amount of load transferred cannot exceed the current capacity (in order to avoid overloading the recipient computing device). In such situations, transferring an amount of computational load may be considered to be transferring "as close to the amount as possible without exceeding the amount". As an exemplary algorithm or logical process for selecting an amount of computational load to transfer, the executing computing device is configured to select an amount of computational load to transfer, the selected amount being (approximately) equal to the current computational load of the executing computing device, unless the current capacity of the recipient computing device is less than the current computational load of the executing computing device, in which case the selected amount is (approximately) equal to the current capacity of the recipient computing device. That is to say, the selected amount is approximately equal to the smaller of the current computational load of the executing computing device and the current capacity of the recipient computing device, and if the two quantities are equal then the selected amount is the current computational load of the executing computing device.

In embodiments which transferring load from the executing computing device to a member of the group comprises transferring load until the member of the group has no remaining capacity for additional load or until the executing computing device has no remaining load: if the executing computing device has no remaining load, the process further comprises entering a sleep, hibernation or standby mode, or switching off.

Depending on the implementation, entering computing devices into one of a sleep, hibernation or standby mode (collectively referred to as a low power setting) or switching off will reduce the power consumed by the computing devices and thus improve the combined energy efficiency of the plurality of computing devices. Methods embodying the present invention cause load to be distributed in such a way that a large proportion of the nodes are in two states: running at full capacity, or empty. Nodes tend to be able to perform more processing per unit energy consumed when they are fully loaded. Furthermore, nodes with no load can enter a low power setting or switch off. Therefore, overall efficiency of the interconnected computing devices is enhanced by running the method embodying the present invention. Nodes in a low power setting or switched off do not execute the process, because they have no load to transfer. They are skipped out and the process executed by the subsequent node having load to transfer in an established order. Optionally, nodes in a low power setting are configured to behave as group members for other computing devices. That is to say, nodes in a low power setting are still operable to send an indication of current capacity to a computing device executing the process, and to receive load if selected as a recipient by the executing computing device (and correspondingly to exit low power setting (by switching on) when or before the load is received in order to process the load).

Optionally, obtaining an indication of current capacity for additional load at a member of the group comprises receiving the indication from the member of the group.

That is to say, obtaining an indication of current capacity for additional load at a member of the group comprises receiving the indication from the member of the group itself. In other words, each member of the group is configured to report its own current capacity to the executing device. The indication may be generated and transferred to the executing device in response to a request or some other form of trigger from the executing device. Alternatively, reporting load to the executing device may be periodical. If no indication is received from a group member, then that group member may be assumed to have no capacity for additional load.

In an implementation of invention embodiments, the computing devices are configured to report their own load to the device executing the process. Thus, the process can be performed in its entirety by the computing devices which perform the processing load themselves. Bottlenecks associated with centralised reporting and control mechanisms are avoided, and the method is scalable.

Methods may be performed as a sequence of more than one iteration, wherein, for each iteration the series of designated positions is the first designated position to the penultimate designated position in the load transfer direction of the one dimension, and each computing device in each of the series of designated positions performs the process once per iteration.

Each iteration may also be referred to as a repetition or cycle. The number of iterations required to approach an optimum load configuration is dependent upon the size of the array and the distribution of load prior to the first iteration. The sequence of iterations may be performed in quick succession initially, for example, continuously, so that once the final process of one iteration is performed the first process of the next iteration begins immediately afterwards. Such quick succession may continue for a predetermined number of iterations or until some other criteria has been satisfied, whereupon iterations are performed periodically with a rest period of configurable length between iterations. Alternatively, continuous performance of iterations may continue indefinitely. Criteria may be, for example, a proportion of the total load that is located on nodes that are operating at capacity (or close enough to capacity to be considered to be operating at capacity for the purposes of the method) and is within a calculated distance of the end of the array toward the load transfer direction. The distance may be calculated, for example, by dividing the total load by the amount of load that can be handled by nodes at each designated position in the one dimension (and optionally rounding up, or rounding up and adding a predetermined buffer value such as one or two).

As mentioned above, the computing devices performing or executing the process may be restricted to those computing devices which are operational and/or have load to transfer.

In embodiments in which n is equal to 2 or 3, each of the n dimensions may correspond to a spatial dimension, and the designated position of each computing device in the n dimensions represents the spatial position of the computing device relative to the other computing devices.

Advantageously, a correspondence between the array of designated positions and the physical locations of the computing devices enables the physical location of the load to be manipulated by the method. Additional energy savings can be obtained. For example, the one dimension and the load transfer direction may be selected such that load tends to be transferred toward a particular end of an enclosure housing the plurality of interconnected computing devices. Cooling systems and other auxiliary apparatus at the opposing end of the enclosure can thus be powered down or switched to a low power setting, and the overall energy consumption caused by handling the computing load and the associated support mechanisms be reduced.

Embodiments of the present invention are particularly effective in configurations in which a plurality of computing devices is configured to execute the process in turn. The beneficial impact of performing said functions on a single computing device among a plurality of interconnected computing devices can increase exponentially if the plurality of interconnected computing devices (or at least more than one among them) perform said functions in sequence. Embodiments of the present invention include a plurality of computing devices as defined above and elsewhere in this document (and particularly as defined by the claims), the plurality of computing devices being the plurality of interconnected computing devices, wherein the plurality of interconnected computing devices are each configured, in turn, to execute the process. Such embodiments provide networked computing environments which can be operated and cooled in an energy efficient manner by implementing an algorithm which enforce parsimonious use of IT infrastructure and cooling resources.

Furthermore, in such embodiments, the order in which the plurality of interconnected computing devices execute the process may be determined by the physical location of the computing devices. Alternatively, the order may be randomised, with the net migration of load from one end of the array to another still resulting. The order being determined by the physical location of the devices may include progressing sequentially along a certain spatial or designated dimension in a particular direction, with the order of computing devices that are co-located in the certain spatial or designated dimension being determined by progressing along those computing devices in another spatial or designated dimension, and so on. Advantageously, embodiments have the effect of displacing computational load, so that computational load tends to be located toward nodes designated with positions at one end of one dimension of the designated array of positions, which may correspond to one end of the enclosure in a spatial sense. Consequently, heat generated by computing devices in the enclosure tends can be localised and can be removed more efficiently by a cooling system. In other words, computational loads can be concentrated in a particular zone or zones of the enclosure or data centre.

Embodiments may further comprise transmitting information representing the spatial distribution of the load to a cooling system, and at the cooling system, controlling the operation of the cooling system in dependence upon the spatial distribution of the load.

The control system of a cooling system operable to remove heat from the computing devices and/or the enclosure in which they are housed may be configured to obtain information representing the spatial distribution of computational load from the plurality of computing devices. Such information may be, for example, a report from each computing device of the computational load along with information enabling the cooling system to determine the location of the computing device within the enclosure (for example, an ID of the computing device if the cooling system has a map, or location coordinates if the cooling system does not store a map). In particular, the cooling system may include one or more CRAG or air conditioning units, ducts, louvers, and valves, and may include devices enabling water cooling in addition to air cooling. Advantageously, the information describing the spatial distribution of computational load (and consequently, the spatial distribution of the power distributed by the cooling devices) can in turn be used to control the operation of the cooling system so that cooling resources (e.g. amount of cool air) are efficiently allocated, therefore yielding additional power savings.

Embodiments of another aspect include: a computing device among a plurality of interconnected computing devices, each computing device having a designated position in the or each dimension of an n-dimensional array of designated positions, in which one direction of one of the n-dimensions is assigned as a load transfer direction, the computing device configured to execute a process comprising: at a capacity indication obtaining module, obtaining an indication of current capacity for additional load at the or each member of a group of one or more computing devices from among the plurality of interconnected computing devices; at a load transfer module, transferring load from the executing computing device to a member of the group at which it is indicated that there is capacity for additional load; wherein membership of the group is restricted to another computing device or other computing devices from among the plurality of interconnected computing devices to the load transfer direction side of the executing computing device in the one direction. For example, membership of the group may be restricted to another computing device or other computing devices in a subsequent adjacent designated position to the executing computing device in the load transfer direction of the one dimension.

Such a computing device may be a server or storage unit or other computer, and the process may be performed by loading a set of instructions, stored as a computer program, into memory and executing them with a processor. Hence, the modules are functional modules realised by hardware components executing software, which software itself may be an embodiment of the present invention. A computing device embodying the invention may include one or more of memory, storage, processor, and I/O devices.

Embodiments of another aspect of the present invention include a system of interconnected computing devices, the system of interconnected computing devices being configured to perform a method embodying the present invention.

Such a system of interconnected computing devices may be configured to transmit information representing the spatial distribution of the load to a cooling system, and the cooling system being configured to control the operation of the cooling system in dependence upon the transmitted information.

Embodiments of another aspect of the present invention include software which, when executed by a system of interconnected computing devices, causes the system of interconnected computing devices to perform a method embodying the present invention, or to function as a system embodying the present invention.

Furthermore, invention embodiments may include a suite of computer programs which, when executed by a distributed network of computing apparatuses, cause the distributed network of computing apparatuses to function as a system embodying the invention.

Furthermore, embodiments of the present invention include a computer program or suite of computer programs, which, when executed by a system of computing apparatuses including a distributed network of storage units cause the system to perform a method embodying the present invention.

Although the aspects (software/methods/apparatuses) are discussed separately, it should be understood that features and consequences thereof discussed in relation to one aspect are equally applicable to the other aspects. Therefore, where a method feature is discussed, it is taken for granted that the apparatus embodiments include a unit or apparatus configured to perform that feature or provide appropriate functionality, and that programs are configured to cause a computing apparatus on which they are being executed to perform said method feature.

In any of the above aspects, the various features may be implemented in hardware, or as software modules running on one or more processors. Features of one aspect may be applied to any of the other aspects.

The invention also provides a computer program or a computer program product for carrying out any of the methods described herein, and a computer readable medium having stored thereon a program for carrying out any of the methods described herein. A computer program embodying the invention may be stored on a computer-readable medium, or it could, for example, be in the form of a signal such as a downloadable data signal provided from an Internet website, or it could be in any other form.

BRIEF DESCRIPTION OF THE DRAWINGS

Preferred features of the present invention will now be described, purely by way of example, with reference to the accompanying drawings, in which.

DETAILED DESCRIPTION OF THE PREFERRED EMBODIMENTS

Figure 1:
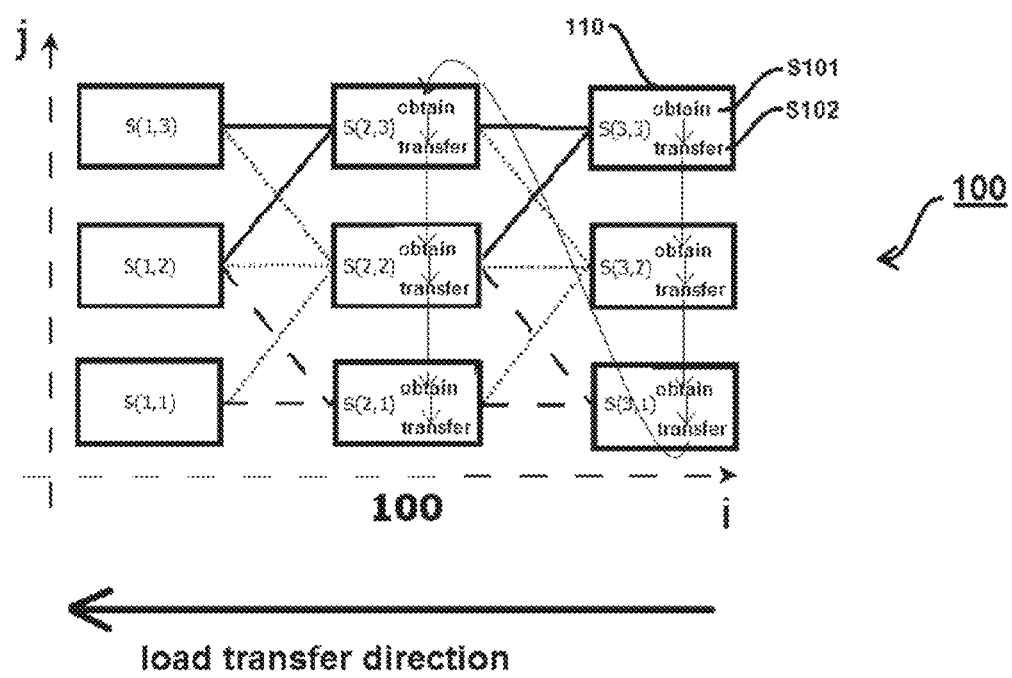
FIG. 1 is a schematic representation of an array of designated positions of interconnected computing devices performing a method embodying the present invention.

FIG. 1 is a schematic representation of an array of designated positions 100 of a plurality of interconnected computing devices in which a method embodying the present invention is performed. The method steps S101-S102 are overlaid onto the schematic illustration of the plurality of interconnected computing devices. Each computing device 110 in the plurality of interconnected computing devices has a designated position in each dimension of a 2-dimensional array of designated positions 100.

The method steps are overlaid onto the schematic representation of the computing devices, and the arrows linking the steps indicates the steps being performed sequentially. The process of obtaining S101 and transferring S102 is performed individually and in turn by one or more computing devices per designated position in a series of designated positions in one dimension of the n-dimensions. In the particular example of FIG. 1, the series of designated positions in one dimension of the n-dimension is positions i=2 and i=3 in the i dimension of the 2-dimensions where designated positions are given by S(i,j), and the one or more computing devices per designated position is each computing device per designated position.

The plurality of computing devices are illustrated in a formation defined by an array of designated positions 100, with the designated array position illustrated within each computing device in the form S(i,j), with i representing position in the i-dimension, and j representing position in the j-dimension. The load transfer direction is from high to low in the i-dimension.

The array topology may be independent of the actual physical topology of the servers within the data centre network. That is to say, the array 100 in FIG. 1 may or may not be defined by the physical location of the servers within the data centre enclosure. As a particular example, the required information exchange functionality can be provided by low-bandwidth communication links between neighbouring servers in the grid, or it can be provided through the existing data centre network infrastructure. In this example, HPC data centres are particularly beneficial environments within which to implement invention embodiments since communication links between neighbouring nodes are already incorporated into the data centre's architecture: since the algorithm of invention embodiments consumes very little bandwidth its impact on the performance of the data centre would be minimal.

For the purposes of the embodiment of FIG. 1 and the discussion thereof, the position of the servers within the array shown in FIG. 1 shall be taken to reflect their physical location within a data centre enclosure. Thus, servers in proximity to one another on the array 100 illustrated in FIG. 1 are also in physical proximity to one another. As a particular example, servers in each column of FIG. 1 could be installed in the same rack: these servers would then have a set of associated cooling resources. The 2-dimensional array of FIG. 1 is only one of many topologies which could be employed in invention embodiments: the topology shown is simple and thus easy to implement.

The computing devices 110 may be referred to as nodes or computing nodes, and may be servers, or some other form of apparatus configured to perform computational processing, I/O functions, and to execute a process embodying the invention. The plurality of computing devices is interconnected via communication links so that data is transferable from any computing device 110 in the array 100 to any other computing device 110 in the array 100. Such transfers may be direct from one computing device 110 to another, or may be via intermediate computing devices. Interconnections may be wired or wireless. Computing devices 110 may, for example, be connected to neighbouring devices in the array via wired connections. Each computing device 110 may have a direct wired connection to the computing devices composing the group 200 when the computing device 110 performs the process.

Executing the process comprises an obtaining step, of obtaining an indication of current capacity for additional load at the or each member of a group 200 of one or more computing devices from among the plurality of computing devices, and a transferring step, of transferring load to a member of the group at which it is indicated that there is capacity for additional load. Membership of the group 200 is restricted to a computing device or computing devices to the load transfer direction side of the executing computing device 110 in the one dimension. In the example of FIG. 1, membership of the group is restricted to computing devices in the subsequent adjacent position from the executing computing device in the load transfer direction in the i-dimension, and to computing devices within a maximum of one place of the executing computing device in the j-dimension. In FIG. 1, group membership for an executing computing device is represented by lines connecting to the load transfer direction (left) side of the executing computing device 110. Executing computing devices 110 are denoted by the process steps being illustrated inside the computing device. Computing devices in the final position in the load transfer direction of the i-dimension do not execute the process.

Lines between computing devices represent the fact that each computing device $S(i,j)$ has information about the computational workloads of its left-hand neighbours $S(i-1, j-1)$, $S(i-1,j)$, and $S(i-1,j+1)$, Therefore in this particular embodiment computing device $S(2,1)$ can access information about the workloads in servers $S(1,1)$ and $S(1,2)$; the communication links that enable this information exchange are represented by dashed lines. Similarly, computing device $S(2,2)$ can access information about the workloads in computing devices $S(1,1)$, $S(1,2)$, and $S(1,3)$; in this case the necessary communication links are represented by dotted lines.

The series of designated positions are a series the sense that they are ordered from a start point to an end point along the load transfer direction. The designated position does not necessarily correspond to or correlate with the temporal order in which computing devices 110 execute the process. However, in some embodiments, it may be that the designated position does correspond to or correlate with the temporal order in which computing devices 110 execute the process, so that in each repetition or cycle, the process is first executed by the computing devices 110 designated the first position in the load transfer direction (in turn), and then by the computing devices 110 at each subsequent position in turn until the penultimate position. The temporal order in which the series of designated positions at which computing devices 110 execute the process are visited may be according to the load transfer direction, so that the first position is at the start of the one dimension in the load transfer direction, and the position of computing devices 110 which execute the process progresses along the load transfer direction until the penultimate designated position. In a 2 dimensional array, computing devices 110 that are co-located in the load transfer direction may execute the process in an order determined by their position in the remaining dimension, for example, progressing from start to end of the remaining dimension in a predetermined direction. For each additional dimension, computing devices 110 that are co-located in all but the additional dimension may execute the process in an order determined by their position in the additional dimension, for example, progressing from start to end of the additional dimension in a predetermined direction. Any of the temporal sequences above may also be utilised in reverse.

The arrows in FIG. 1 denote an order in which the computing devices 110 execute the process. It can be seen that the order progresses sequentially from the first position to the penultimate position in the load transfer direction of the i-dimension, and where computing devices are co-located in the i-dimension, from high to low in the j-dimension. A single repetition of the method is illustrated in FIG. 1. Optionally, the computing devices 110 may perform more than one repetition.

Executing the process may be considered to be brokering, initiating, coordinating, or instigating a transaction. The process comprises steps performed by the computing device 110 from which load is transferred, which may be referred to as the transferor, donor, source computing device, or executing computing device. In addition to the process performed by the donor, the method may also comprise steps performed by one or more group members, which are potential load recipients, or candidate load recipients. For example, steps performed by a group member may comprise sending an indication of current capacity for additional load at the group member to the donor, and, if the group member is selected by the donor as a recipient of load, receiving load from the donor. For example, the donor may notify group members 200 selected as load recipients in advance of load transfer.

The obtaining step may simply comprise receiving the indication of current capacity from the group members. Optionally, it may further comprise issuing a request or some other form of trigger to the group members 200 to request the indication.

In some computing devices computational load is assumed to be proportional to power consumption, and hence current computational load is derivable from an indication of power consumption rates. Therefore, the indication of current capacity may include, or be provided in the form of, an indication of power consumption rate. The SPECpower_ssj2008 benchmark provides a load-power characterisation which can be utilised by the computing device executing the process (the executing computing device) in invention embodiments to derive computational load from an indication of power consumption rate. Alternatively, the computing devices 200 from which the indication of current capacity is obtained may themselves utilise a load-power characterisation such as the SPECpower_ssj2008 benchmark to determine their own current computational load to report to the particular computing device. The SPECpower_ssj2008 is exemplary of a relationship or function for calculating current capacity (or current load) as a function of power consumption. Embodiments are not limited to that particular benchmark.

For the sake of consistency of use of language, in this document we shall take the maximum computational load that a computing device can handle at a time to be the "maximum capacity" of that device, and the computational load being handled at a point in time to be the "current computational load", wherein the point in time is the time of generating the indication of current capacity. The "current capacity" of a computing device is the difference between the maximum capacity and the current computational load. The current capacity may also be referred to as "the current capacity to perform computational load additional to current computational load".

Current capacity may be quantified as a proportion of maximum capacity of the computing device from which the indication is obtained, or may be quantified as an absolute value of computational load (whether it is an indication of power consumption, or any other form of indication). The executing computing device itself may be aware of the maximum capacity of the or each computing device in the group, so that an indication of one of current capacity or current computational load enables the other to be calculated/obtained. Alternatively, the indication of current capacity may include two of the following, which allow the third to be calculated: maximum capacity, current capacity, current computational load.

It may be that the computing device 110 executing the process performs a plurality of transfers of computational load (from itself) to recipient computing devices from among the group 200 of computing devices. Alternatively, it may be that the computing device 110 executing the process performs a single transfer of computational load to a recipient computing device. A transfer may only be performed if a member of the group 200 has current capacity, so if none of the group members have any capacity (all the group members indicate that they have zero capacity, or are non-operational) then a transfer is not performed.

The precise algorithm executed by the load transfer determination unit in determining whether or not to instruct a load transfer, and what load transfer to instruct, will depend upon the details of the implementation of the embodiment. Advantageously, algorithms may be selected which lead to a more efficient operation of the plurality of interconnected computing devices, or which fulfil certain quality of service requirements. Technical advantages associated with the migration of load from end of the array 100 to the other are not dependent upon a particular rationale for selecting which group members 200 will receive load, and the amount of load that they will receive. However, it may be that certain technical effects will be emphasised by applying particular algorithms to the selection of load recipients and size of load transfers. For example, it may be that the computing device 110 executing the process performs a load transfer if there is one or more computing devices in the group 200 of computing devices with capacity for additional load, and the load recipient may be selected as the computing device from among the one or more having capacity for additional load with the smallest or greatest capacity for additional load.

Once the process of obtaining capacity indications and transferring load (or at least determining whether or not to transfer load) has been performed by a computing device 110, the process is performed by another computing device 110. The computing device 110 which has just finished executing the process may send a notification to the next computing device 110 in a predetermined order (represented by the arrows in FIG. 1) to begin executing the process. The membership of the group 200 is defined for each executing computing device 110, although, of course, there may be partial or complete overlap between the groups 200 defined for more than one executing computing device 110. In the example of FIG. 1, a complete repetition of the method is represented, with each computing device 110 in the first to the penultimate position in the load transfer direction of the i-dimension executing the process once. The method may comprise more than one repetition of the process. There may be a predetermined pause between repetitions. Repetitions may be triggered by the completion of a previous repetition, the passing of a predetermined period of time since the beginning or end of a previous repetition, and/or by the arrival of a predetermined amount of new load in the plurality of interconnected computing devices.

The order in which the process is performed by computing devices within a single repetition may be in accordance with coordinates or addresses attributed to the computing devices 110 in a manner which allows an order to be established among the plurality of computing devices 110. In particular embodiments, the order is based upon the physical location of the computing devices, so that the order runs from one end of an enclosure to another in a first direction, and for computing devices which are co-located in that first direction, another order is established, for example, running from one side of the enclosure to another in a second (orthogonal direction), and likewise for computing devices co-located in both the first and second directions, a further order is established, for example, running from one side of the enclosure to another in a third (mutually orthogonal) direction.

In the example of FIG. 1, the group 200 for each computing device 110 is composed of the computing devices in the neighbouring position in the array to the load transfer direction of one dimension, and within a maximum of one position of the computing device in the other of the two dimensions. The members of the group from which capacity indications are obtained by a computing device executing the process may be referred to as the group associated with the computing device. Group and neighbourhood may be used interchangeably. Executing the process may be considered to be performing an algorithm, which may include decision making instructions in addition to the obtaining and transferring. The algorithm may also be viewed globally for the array as a whole, and can be considered to visit each executing computing device in turn.

Figure 2:
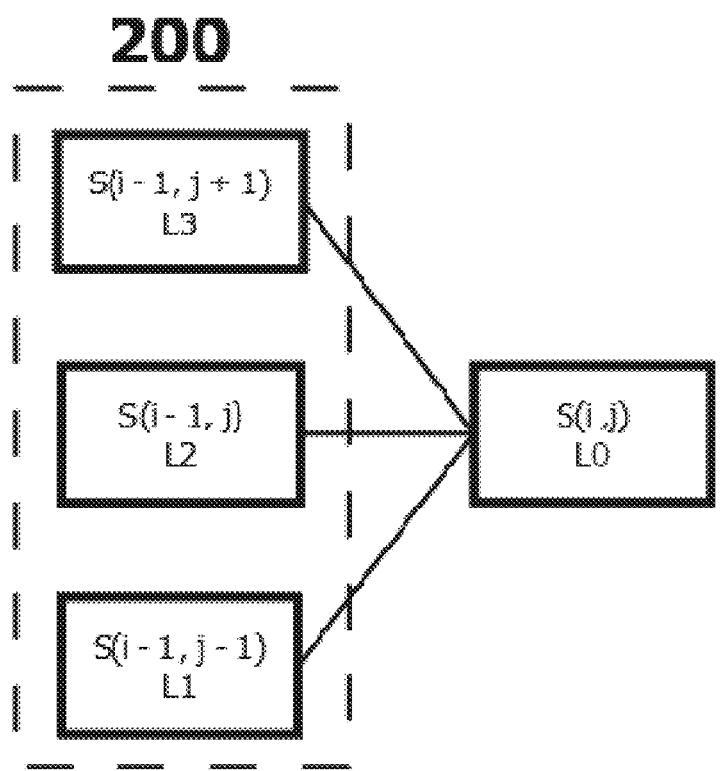
FIG. 2 is a schematic representation of a computing device executing a process as part of a method embodying the present invention along with a group of computing devices required for executing the process.

Referring to the exemplary topology in the example of FIG. 1, each computing device S(i,j) 110 in array 100 has an associated group 200 or neighbourhood composed by a maximum of servers S(i−1,j−1), S(i−1,j), and S(i−1,j+1): an illustration of such a group 200 is depicted in FIG. 2. This is a maximum group size using the rationale for inclusion of the group 200 in the example of FIG. 1 because at the edges in the j-dimension there will be one fewer computing device per group 200. The algorithm is efficient in terms of information exchange because, even at its maximum, only indications of current capacity from three group members are required.

FIG. 2 also includes a representation of the load at each computing device 110. The load at the group members 200 is represented by L1-L3, and the load at the executing computing device is represented by L0. An exemplary algorithm for deciding whether to transfer load, how much load to transfer, and to which recipient, will be set out below with reference to the Figures.

In a 2-dimensional array with M positions in the i-dimension and N positions in the j-dimension, for each i>1 (i.e. from the first to the penultimate position in the load transfer direction of the i-dimension), each computing device S(i,j) such that 1<i≤M and 1≤j≤N is visited sequentially along each column in array 100. Computing device S(i,j) has access to workload values L1, L2 and L3 in the group 200, and each time a computing device S(i,j) is visited the algorithm identifies a computing device Smax amongst computing devices S(i−1,j−1), S(i−1,j), and S(i−1,j+1) such that Lmin=L(Smin) is the minimum load in the neighborhood 200 and Lmin<100%. In other words, $$S_{min}=S|L_{min}=L(S)\leq\{L1,L2,L3\}$$

Alternatively, the algorithm can also operate by identifying a computing device Smax amongst servers S(i−1,j−1), S(i−1,j), and S(i−1,j+1) such that Lmax=L(Smax) is the maximum load in the group 200 and Lmax<100%.

$$S_{max}=S|L_{max}=L(S)\geq\{L1,L2,L3\} \text{ and } L_{max}<100$$

In the forthcoming paragraphs it shall be assumed that the algorithm operates by identifying the computing device Smin with the minimum load in the group 200 of executing computing device S(i,j). The executing computing device 110 (or, more specifically, the algorithm or instructions being performed by said computing device) then tries to bring computing device Smin to 100% utilization by migrating its own load to computing device Smin: if the load L0 in computing device S(i,j) is smaller than the available capacity C=100−Lmin in computing device Smin, load L0 is migrated from S(i,j) to Smin until the load in computing device S(i,j) is zero, and therefore can be turned off or hibernated or entered into some other low power setting. If the load L0 in computing device S(i,j) is greater than the available capacity C in Smin, load is migrated from S(i,j) to Smin until the load in computing device Smin is 100%.

Figure 3:
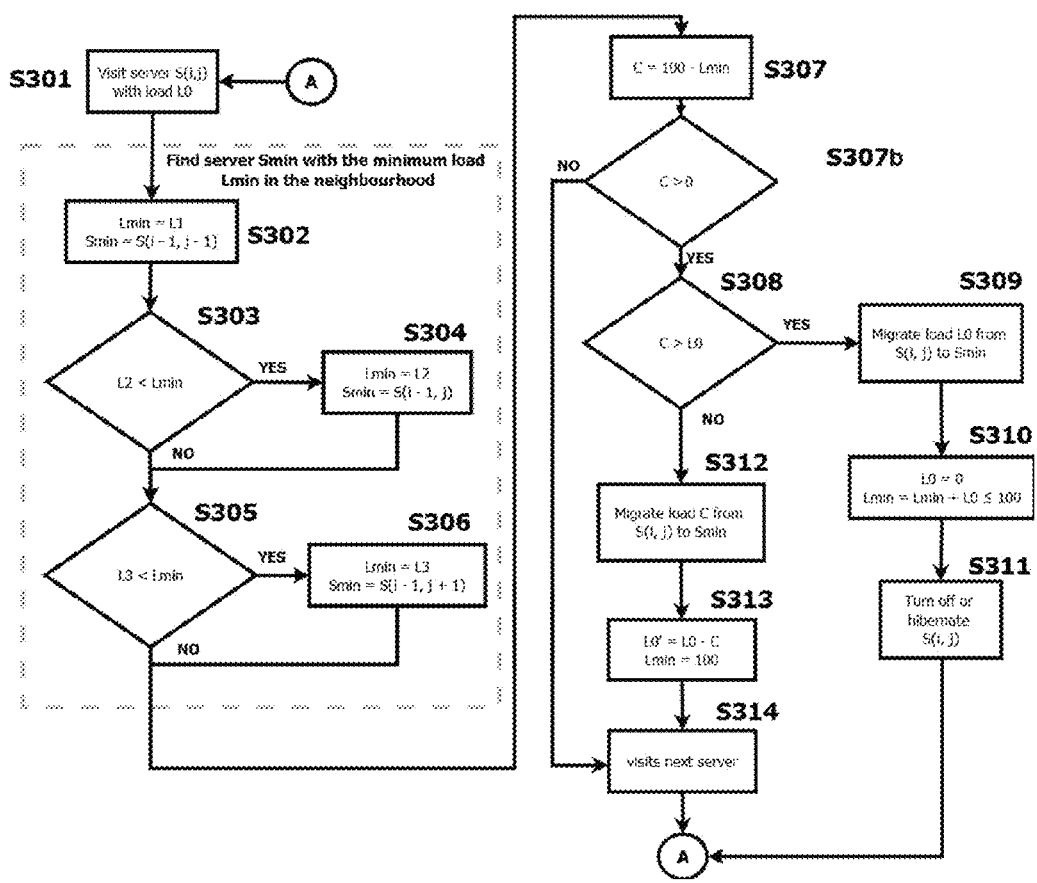
FIG. 3 is a flowchart of a method embodying the present invention.

FIG. 3 shows a flow diagram with an exemplary process or algorithm being executed by computing device S(i,j) in FIG. 2. At step S301 the computing device S(i,j) is notified that it is to begin execution of the process. The purpose of steps S302 to S306 within the dotted box is to obtain the indications of current capacity from the group members 200 and establish which of them has the greatest capacity for additional load. In this example indications of current capacity and loads are represented by percentages of full capacity, where a load of 100 is an indication of a computing device running at full capacity. The computing device in the group with the greatest current capacity as a percentage of its full capacity is selected as load transfer recipient. In certain implementations, it may be assumed that all computing devices have the same absolute capacity, so the computing device in the group 200 with the greatest capacity for additional load is also the computing device Smin with the smallest current load Lmin.

At step S302 computing device in designated position S(i−1,j−1) (we note that, for convenience, computing devices may be referred to by their designated position) is identified as computing device Smin and the variable Lmin is assigned the value L1, the value L1 being obtained from S(i−1,j−1) as an indication of current capacity. At step S303, the indication of current capacity from computing device S(i−1,j) is obtained and the load of computing device S(i−1,j) assigned the variable L2. L2 is compared with the value stored as variable Lmin. If L2 is smaller than Lmin the value of Lmin is updated to L2 and the computing device S(i−1,j) is identified as Smin at step S304, before the flow continues to step S305. If L2 is greater than Lmin the flow continues to step S305.

At step S305 the obtaining and comparison process of step S303 is repeated for computing device S(i−1,j+1), and if L3 is less than Lmin, updates are performed at S306 so than Lmin is assigned the value L3, and computing device S(i−1,j+1) is identified as Smin. The obtaining, comparison, and updating if necessary continues for each group member that is operational.

At step S307 the available capacity C in computing device Smin is calculated as C=100−Lmin. As an optional step, at step S307b it is checked whether the available capacity C in computing device Smin is greater than 0. If it is, then the flow proceeds to step S308. If it is not, then no load is transferred and the next computing device in the predetermined order is notified and begins executing the process.

At step S308 the capacity C is compared with the load L0 in computing device S(i,j): if the available capacity C in computing device Smin is greater than the load L0, then the load L0 is migrated to computing device Smin at step S309; therefore at step S310 there is zero load running in computing device S0, while computing device Smin now has a load equal to Lmin+L0. Since no load is running at computing device S(i,j) it is turned off or hibernated or entered into some other low power setting at step S311. Energy consumption is reduced by entering S(i,j) into a reduced power/performance state to reduce energy consumption.

If the capacity C is smaller than the load L0 the flow proceeds to step S312 at which a load equivalent to the available capacity C is moved from computing device S(i,j) to computing device Smin, which will now be utilised at 100% capacity, while computing device S(i,j) will now have a load S'0=L0−C. The flow continues to step S314, where the algorithm continues to, or is performed by, the next computing device in a predetermined order (see, for example, the arrows of FIG. 1).

Figure 4:
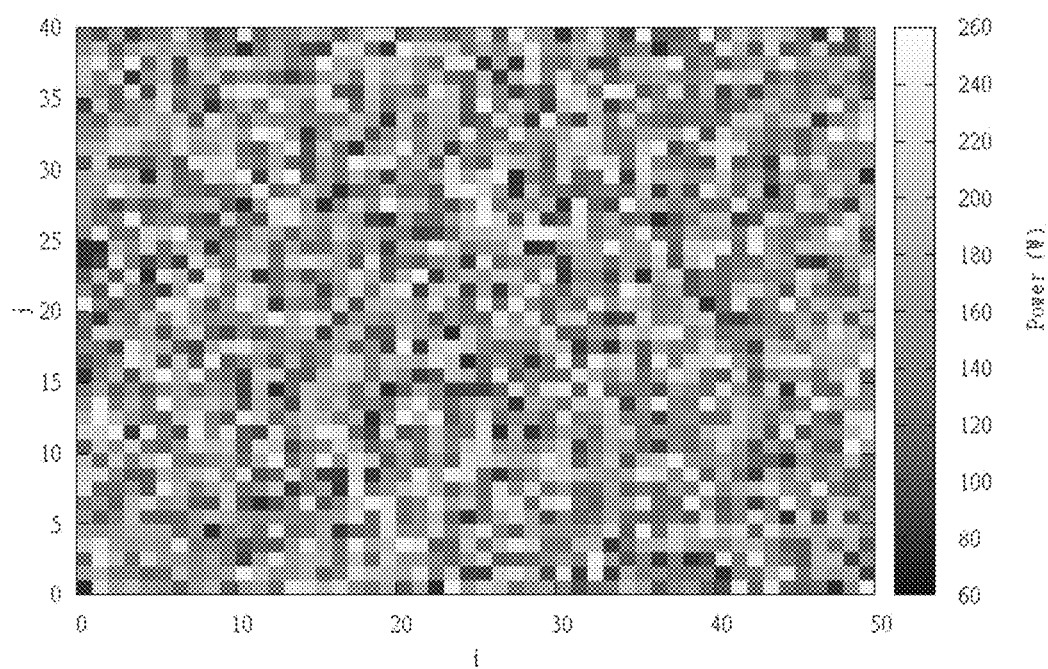
FIGS. 4 to 6 illustrate the results of a simulation of performing a method embodying the present invention in a grid of interconnected computing devices.
Figure 5:
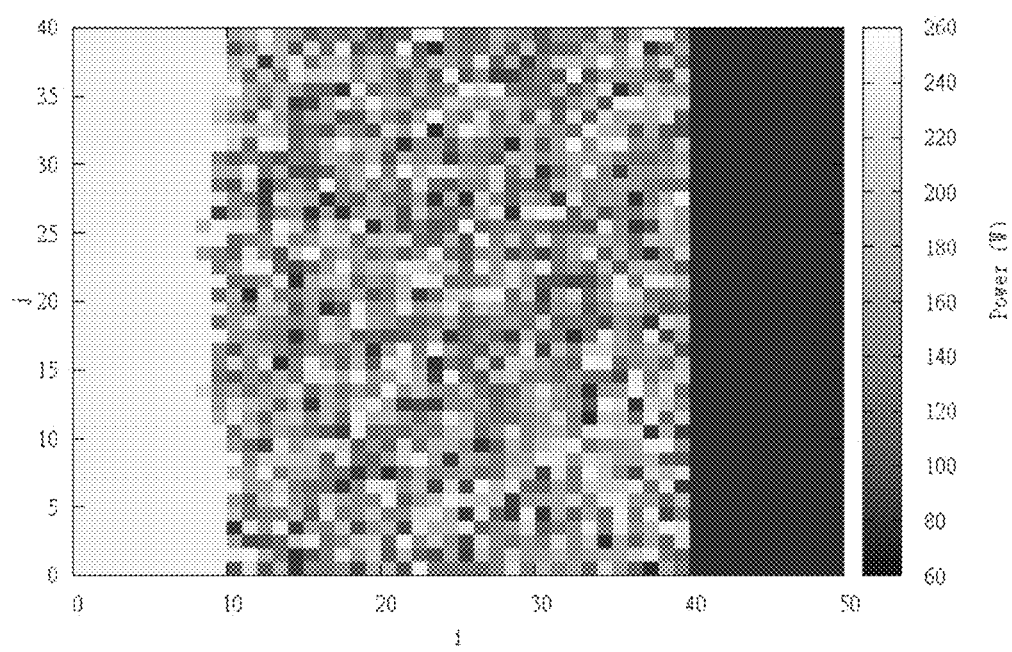
Figure 6:
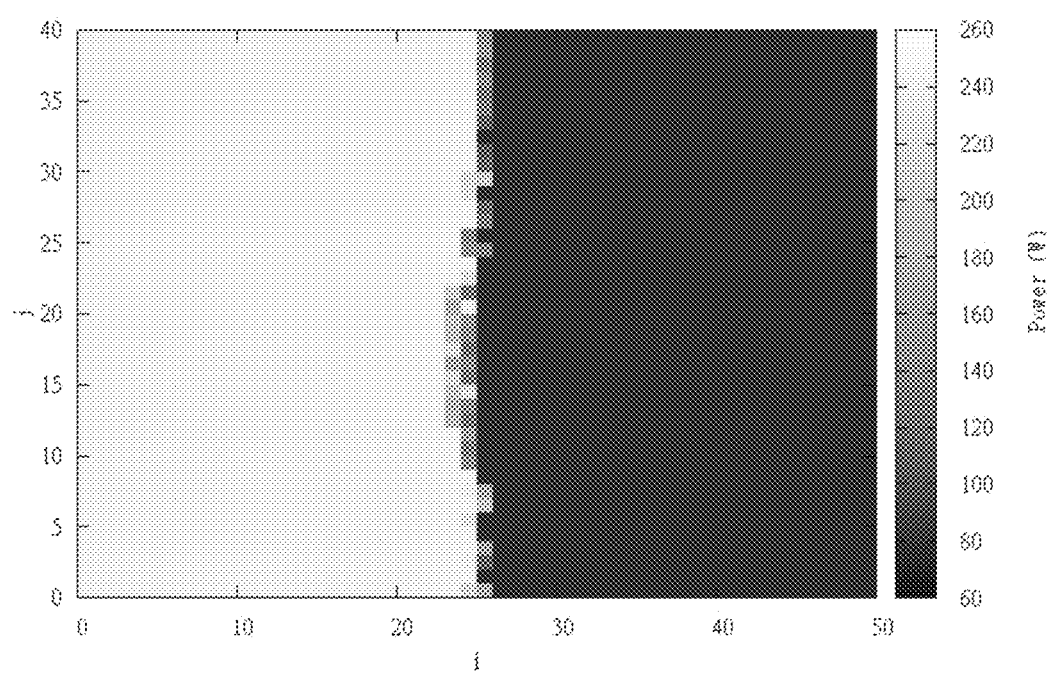

FIGS. 4 to 6 illustrate the results of a simulation executing the exemplary process of FIG. 3 on a repeated basis at each computing device in the first to penultimate positions in the load transfer direction in one dimension of a 2-dimensional array (call these computing devices the "executing servers"). In the simulation the load transfer direction is from high to low in the i-dimension (i.e. from right to left in the Figure). FIG. 4 depicts a snapshot of the load distribution in a data centre initially: an array of 2000 servers is deployed in an array or grid of size 40×50: each of the square elements in the figure represents a server with a random load, while the power consumed by each server is represented by the shade of each element as specified by the scale at the right side of the figure. It can be seen that load is randomly distributed so that any two zones of the array are likely to have a similar ratio of heavily loaded to lightly loaded servers, irrespective of zone location. Furthermore, a given server is equally likely to have any value of load ranging from the minimum to the maximum: there is an even distribution of loads. In this particular example the power consumed by an individual server ranges between 260 W at 100% load and 76 W at zero load, while the total power consumed by the 2000 servers is 321.7 kW for the particular load distribution used in the simulation. The distribution of servers in this array can be related to their physical distribution in an actual data centre: e.g. the servers in the left hand side of the array could be located in a group of racks which are concentrated in a certain area of the data floor.

FIG. 5 shows a snapshot of the power distribution in the servers after each executing server has executed the process 10 times in sequence, that is, after 10 repetitions or cycles. It can be observed that load is migrating towards the left hand side of the array, much like a percolation process in porous media. At this stage a reduction of 10% in power consumption can be achieved by turning off idle servers.

FIG. 6 shows another power distribution snapshot after 25 repetitions or cycles: there is a concentration of servers operating at full load at the left hand side of the grid, while the rest of the servers have no load. By turning off the servers with no load a reduction in power consumption of 25% can be achieved.

In addition, reductions in energy consumption by support equipment such as cooling equipment can be achieved. The concentration of fully-loaded servers in a certain area of the data centre means that cooling resources can be allocated to this area while being turned off or greatly reduced in another, thereby allowing additional power savings. In this sense the spatial load distribution achieved by this algorithm is optimal (when there is a correlation between the spatial arrangement of computing devices and the designated positions) since the totality of the load is concentrated in a desired physical area.

Figure 7:
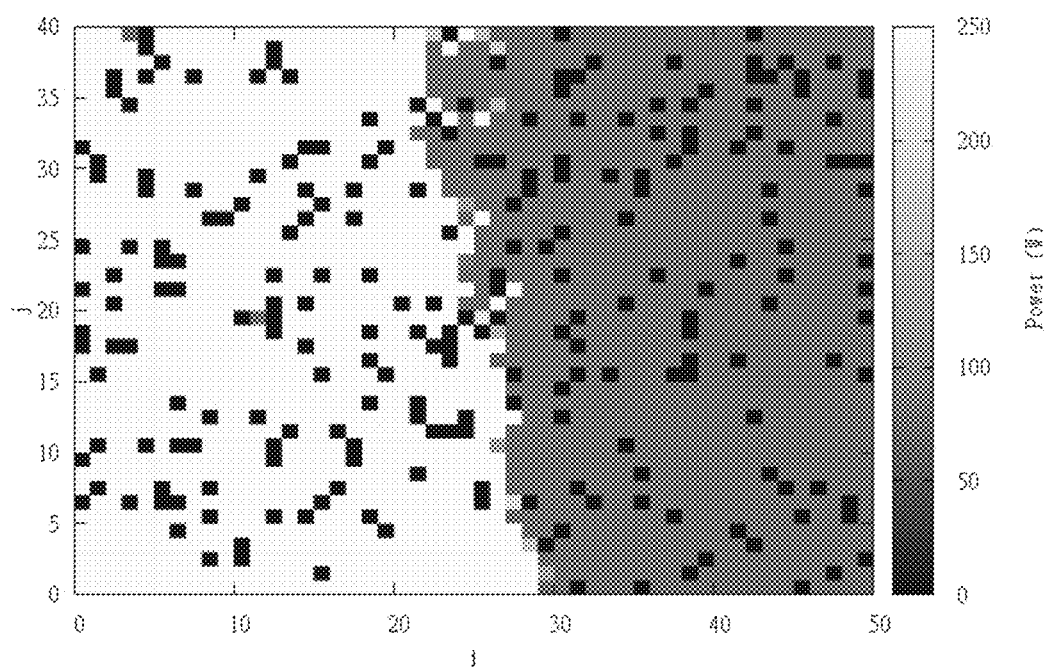
FIG. 7 illustrates the results of a simulation in which certain of the computing devices are non-operational.

The simplicity of the algorithm and the small bandwidth required allows for a small execution time; therefore the necessary load migration can take place at a timescale which is much shorter than the rate at which incoming service requests arrive. Furthermore, methods embodying the present invention such as the algorithm set out in FIG. 3 are remarkably robust in the presence of broken down servers. FIG. 7 shows the resulting spatial load distribution after 25 repetitions when 10% (randomly distributed) of the servers are broken down. Faulty servers are represented by black squares in FIG. 7. It can be seen that a near-optimal distribution of load is still achieved in the presence of a high proportion of broken servers.

Figure 8:
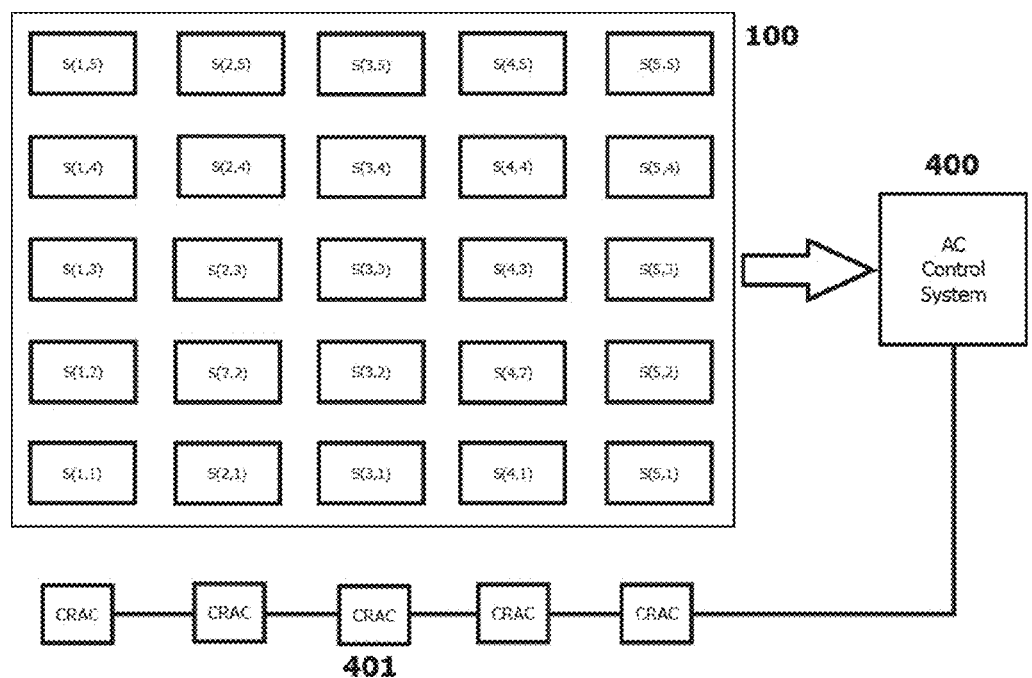
FIG. 8 illustrates an optional embodiment including a cooling system.

FIG. 8 shows a further optional embodiment in which the server grid 100 interacts with the cooling system by sending information about the spatial distribution of the loads to an air conditioning control system 400; this control system adjusts the distribution of cooling resources (e.g. airflow supplied by CRAG units 410) in response to the distribution of loads on the data floor. Such an embodiment would be particularly effective in data centres with a cooling resource allocation mechanism that is responsive to the spatial distribution of load, such as the one set out in European patent publication EP2615897.

The invention claimed is:

1. A method for distributing load among a plurality of interconnected computing devices, each computing device having a designated position in each dimension of an n-dimensional array of designated positions, wherein n is equal to 2 or 3, each of the n-dimensions corresponds to a spatial dimension, and the designated position of each computing device represents the spatial position of the computing device relative the other computing devices in the respective dimension, the method comprising, individually, at one or more of the interconnected computing devices per designated position in a series of designated positions in one dimension of the n-dimensional array, in which one dimension one direction is assigned as a load transfer direction, executing a process comprising:
   obtaining an indication of current capacity for additional load at one of a and each member of a group of one or more computing devices from among the plurality of interconnected computing devices; and
   transferring load from the executing computing device to a member of the group at which it is indicated that there is capacity for additional load;
   wherein membership of the group is restricted to one of a computing device and computing devices to a load transfer direction side of the executing computing device in the one dimension.

2. The method according to claim 1, wherein n is greater than or equal to two, and membership of the group is restricted to one of a computing device and computing devices within a predetermined number of designated positions of an individual computing device in one of the one dimension and each of the other n-dimensions than the one dimension.

3. The method according to claim 2, wherein n is equal to two, and each computing device in a subsequent adjacent designated position to a designated position is a member of a group for at least one of the computing devices in the designated position.

4. The method according to claim 1, wherein the one or more computing devices per designated position in one dimension executing the process is each a computing device in the designated position.

5. The method according to claim 1, wherein the process executed by the individual computing devices further comprises:
selecting the member of the group to which to transfer load, comprising: based on obtained indications of current capacity for additional load at one of the and each member of the group, selecting the computing device having a one of the greatest and least capacity from among the computing devices in the group indicated as having non-zero current capacity.

6. The method according to claim 1, wherein transferring load from the executing computing device to a member of the group comprises transferring load one of until the member of the group has no remaining capacity for additional load and until the executing computing device has no remaining load.

7. The method according to claim 6, wherein if the executing computing device has no remaining load, the process further comprises entering one of a sleep, hibernation and standby mode, and switching off.

8. The method according to claim 1, wherein obtaining an indication of current capacity for additional load at a member of the group comprises receiving the indication from the member of the group.

9. The method according to claim 1, wherein the method is performed as a sequence of more than one iteration, wherein, for each iteration a series of designated positions is the first designated position to a penultimate designated position in the load transfer direction of the one dimension, and each computing device in each of the series of designated positions has a position in a predetermined sequence in which the computing devices are to execute the process, and the computing devices are configured to execute the process in turn according to the predetermined sequence omitting computing devices having a zero current load at their turn.

10. The method according to claim 2, wherein n is equal to one of 2 and 3, each of the n dimensions corresponds to a spatial dimension, and the designated position of each computing device in the n dimensions represents the spatial position of the computing device relative to the other computing devices.

11. The method according to claim 1, further comprising transmitting information representing a spatial distribution of the load to a cooling system, and at the cooling system, controlling operation of the cooling system in dependence upon the spatial distribution of the load.

12. A computing device among a plurality of interconnected computing devices, each computing device having a designated position in each dimension of an n-dimensional array of designated positions, wherein n is equal to 2 or 3, each of the n-dimensions corresponds to a spatial dimension, and the designated position of each computing device represents the spatial position of the computing device relative the other computing devices in the respective dimension, in which one direction of one dimension of the n-dimensional array is assigned as a load transfer direction, the computing device configured to execute a process comprising:
at a capacity indication obtaining module, obtaining an indication of current capacity for additional load at one of a and each member of a group of one or more computing devices from among the plurality of interconnected computing devices; and
at a load transfer module, transferring load from the executing computing device to a member of the group at which it is indicated that there is capacity for additional load;
wherein membership of the group is restricted to one of another computing device and other computing devices from among the plurality of interconnected computing devices to a load transfer direction side of the executing computing device in the one dimension.

13. A system of interconnected computing devices, the system of interconnected computing devices each having a designated position in each dimension of an n-dimensional array of designated positions, wherein n is equal to 2 or 3, each of the n-dimensions corresponds to a spatial dimension, and the designated position of each computing device represents the spatial position of the computing device relative the other computing devices in the respective dimension, in which one direction of one dimension of the n-dimensional array is assigned as a load transfer direction, the computing device configured to execute a process comprising:
at a capacity indication obtaining module, obtaining the indication of current capacity for additional load at one of a and each member of a group of one or more computing devices from among the plurality of interconnected computing devices; and
at a load transfer module, transferring load from an executing computing device to a member of the group at which it is indicated that there is capacity for additional load;
wherein membership of the group is restricted to one of another computing device and other computing devices from among the plurality of interconnected computing devices to a load transfer direction side of the executing computing device in the one dimension.

14. Apparatus comprising the system of interconnected computing devices according to claim 13 and a cooling system, the system of interconnected computing devices being configured to transmit information representing a spatial distribution of the load to the cooling system, and the cooling system being configured to control an operation of the cooling system in dependence upon the transmit information.

15. A non-transitory storage medium storing a computer program which, when executed by a plurality of interconnected computing devices, each computing device having a designated position in each dimension of an n-dimensional array of designated positions, wherein n is equal to 2 or 3, each of the n-dimensions corresponds to a spatial dimension, and the designated position of each computing device represents the spatial position of the computing device relative the other computing devices in the respective dimension, causes the plurality of computing devices to execute a method comprising, individually, at one or more computing devices per designated position in a series of designated positions in one dimension of the n-dimensional arrays, in which one dimension one direction is assigned as a load transfer direction, executing a process comprising:
obtaining an indication of current capacity for additional load at one of a and each member of a group of one or more computing devices from among the plurality of computing devices; and
transferring load from the executing computing device to a member of the group at which it is indicated that there is capacity for additional load;

wherein membership of the group is restricted to one of a computing device and computing devices to a load transfer direction side of the executing computing device in the one dimension.

* * * * *